(12) United States Patent
Henson et al.

(10) Patent No.: US 7,631,478 B2
(45) Date of Patent: Dec. 15, 2009

(54) ELECTRIC IMPLEMENT LIFT SYSTEM FOR MOWER CUTTING UNITS

(75) Inventors: Robert Alan Henson, Charlotte, NC (US); Harlin James Trefz, Jackson, TN (US); Thomas Gregory Bartlett, Pineville, NC (US)

(73) Assignee: Deere & Company, Moline, IL (US)

( * ) Notice: Subject to any disclaimer, the term of this patent is extended or adjusted under 35 U.S.C. 154(b) by 254 days.

(21) Appl. No.: 11/429,367

(22) Filed: May 5, 2006

(65) Prior Publication Data

US 2007/0256400 A1 Nov. 8, 2007

(51) Int. Cl.
*A01B 73/00* (2006.01)

(52) U.S. Cl. .................................. 56/228; 56/7; 56/15.3

(58) Field of Classification Search ........................ 56/6, 56/7, 14.7, 14.9–15.3, 15.5, 15.9, 16.2, 17.1, 56/134, 228, 249, 294
See application file for complete search history.

(56) References Cited

U.S. PATENT DOCUMENTS

| | | | |
|---|---|---|---|
| 4,663,923 A | 5/1987 | Boice | |
| 4,700,536 A * | 10/1987 | Torras | 56/15.8 |
| 4,747,257 A * | 5/1988 | Hutchison | 56/15.8 |
| 5,042,236 A * | 8/1991 | Lamusga et al. | 56/7 |
| 5,123,234 A | 6/1992 | Harada et al. | |
| 5,297,378 A | 3/1994 | Smith | 56/7 |
| 5,343,680 A | 9/1994 | Reichen et al. | 56/249 |
| 5,406,778 A | 4/1995 | Lamb et al. | |
| 5,459,984 A | 10/1995 | Reichen et al. | 56/7 |
| 5,540,037 A | 7/1996 | Lamb et al. | 56/7 |
| 5,553,445 A | 9/1996 | Lamb et al. | 56/7 |
| 5,794,422 A | 8/1998 | Reimers et al. | 56/11.9 |
| 6,131,379 A * | 10/2000 | Ehn, Jr. | 56/15.7 |
| 6,698,171 B2 * | 3/2004 | Doerflinger | 56/7 |
| 2002/0174634 A1 * | 11/2002 | Franet et al. | 56/7 |
| 2006/0021315 A1 | 2/2006 | Brandon | |

FOREIGN PATENT DOCUMENTS

DE 299 15 336 2/2001

\* cited by examiner

*Primary Examiner*—Thomas B Will
*Assistant Examiner*—Mai T Nguyen

(57) ABSTRACT

An electric implement lift system for mower cutting units may include an electric motor having a rotatable output shaft with a pivot bracket mounted thereto, a lift link or a pair of lift links, each lift link having a first end connected to the pivot bracket and a second end connected to a lift arm, the output shaft rotatable in a first direction to raise the mower cutting unit and in a second direction to lower the mower cutting unit. The output shaft may be rotatable in the first direction to move the cutting unit to a top/center position and rotatable further in the first direction to move the cutting unit to a raised/transport position.

14 Claims, 7 Drawing Sheets

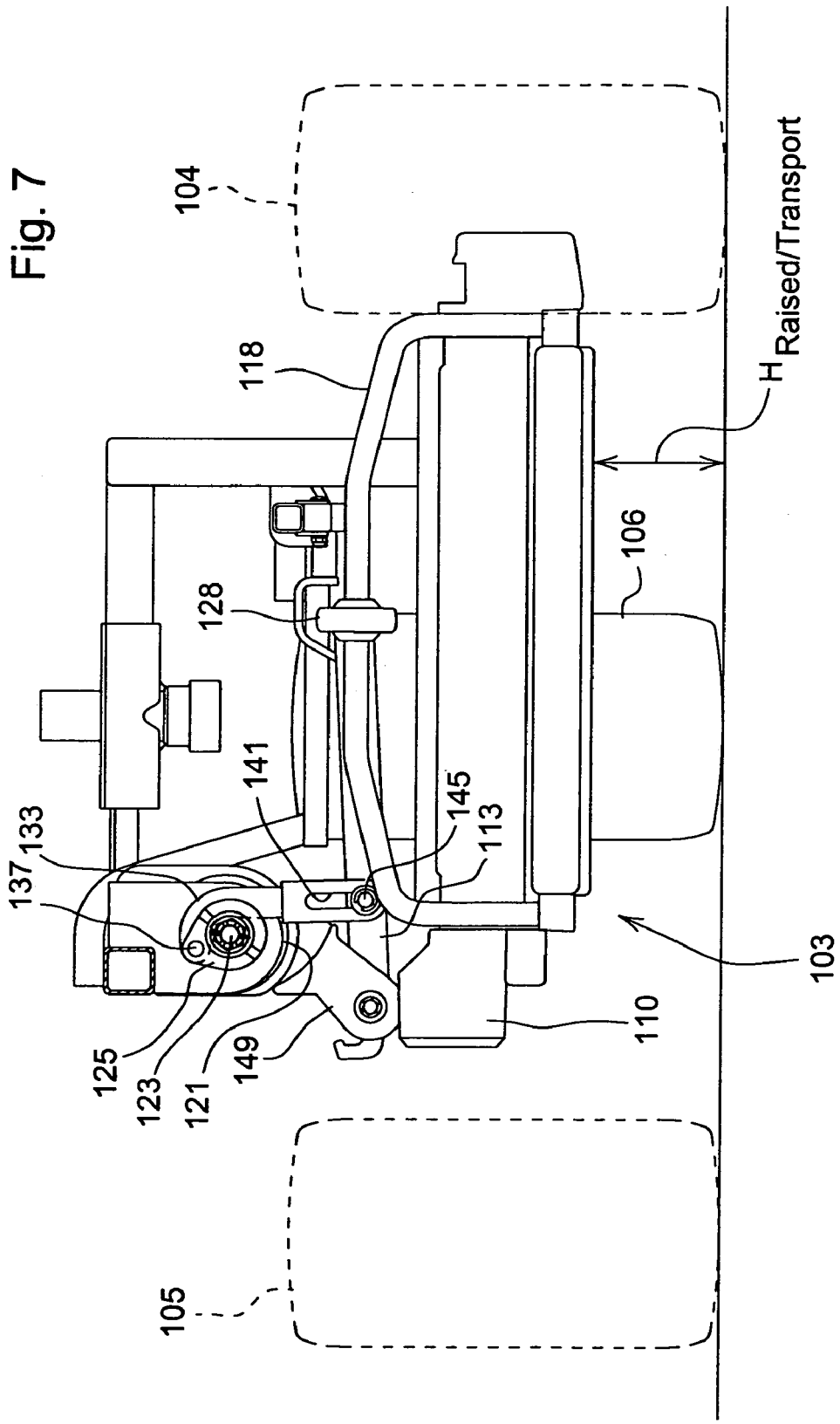

ELECTRIC IMPLEMENT LIFT SYSTEM FOR MOWER CUTTING UNITS

FIELD OF THE INVENTION

This invention relates generally to grass mowing machines, and specifically to an electric implement lift system for mower cutting units.

BACKGROUND OF THE INVENTION

Grass mowing machines for cutting grass on golf courses or other areas that require high quality cutting such as parks and athletic fields, may include a plurality of cutting units. Each cutting unit may be attached to the outer end of a lift arm extending laterally outwardly from a traction vehicle. Each cutting unit may be a reel-type cutting unit with a generally horizontally-aligned cutting reel, and front and/or rear rollers that support or carry the cutting unit across the surface of the ground during mowing. Blades of the rotating reel interact with a bedknife to cut grass with a scissoring action. Alternatively, each cutting unit may be a rotary cutting deck with a blade rotating on a generally vertical axis under a deck.

Grass mowing machines may include implement lift systems to raise and lower the cutting units on the outer ends of the lift arms. Implement lift systems for mower cutting units may include hydraulic cylinders connected to the lift arms. For example, a hydraulic cylinder attached to a lift arm may be extended to raise a cutting unit to a transport or service position, and retracted to lower the cutting unit to a mowing position. Examples of grass mowing machines with hydraulic implement lift systems for mower cutting units are provided in U.S. Pat. Nos. 5,297,378 and 5,343,680.

Alternatively, grass mowing machines may have implement lift systems for mower cutting units that include electric motors and linear actuators to raise and lower the cutting units. For example, an electric motor may drive a linear actuator such as a ball screw assembly and shaft attached to a lift arm to an extended position to raise a cutting unit, or to a retracted position to lower a cutting unit. Examples of mowing machines having electric implement lift systems for mower cutting units are shown in U.S. Pat. Nos. 5,540,037 and 5,553,445.

It is highly desirable to use an electric implement lift system for mower cutting units, especially on mowing machines with electric traction and implement drive. However, electric implement lift systems with linear actuators are not sufficiently durable, nor are they sufficiently reliable, to repeatedly raise and lower large cutting units weighing more than about 100 pounds each. Additionally, electric implement lift systems with linear actuators may not have sufficient input torque to raise and hold or lock a cutting unit in a raised/transport or service position.

An electric implement lift system for mower cutting units is needed that is durable and reliable enough to repeatedly raise and lower large cutting units weighing over about 100 pounds. An electric implement lift system for mower cutting units is needed that will not require input torque from a motor to hold or lock a cutting unit in the raised/transport or service position.

SUMMARY OF THE INVENTION

An electric implement lift system for mower cutting units can repeatedly raise and lower large cutting units weighing over about 100 pounds each. The electric implement lift system does not require input torque from a motor to hold or lock cutting units in a raised/transport position. The electric implement lift system may include an electric motor having a rotatable output shaft with a pivot bracket mounted thereto, a lift link or a pair of lift links, each lift link having a first end connected to the pivot bracket and a second end connected to a lift arm, the output shaft rotatable in a first direction to raise the mower cutting unit and in a second direction to lower the mower cutting unit. The output shaft may be rotatable in the first direction to move the cutting unit to a top/center position and rotatable further in the first direction to move the cutting unit to a raised/transport position

BRIEF DESCRIPTION OF THE DRAWINGS

FIG. 7 is a front partial section view of an electric implement lift system for mower cutting units according to one embodiment of the invention, showing a rear cutting unit in a raised/transport position.

DESCRIPTION OF THE PREFERRED EMBODIMENT

Figure 1:
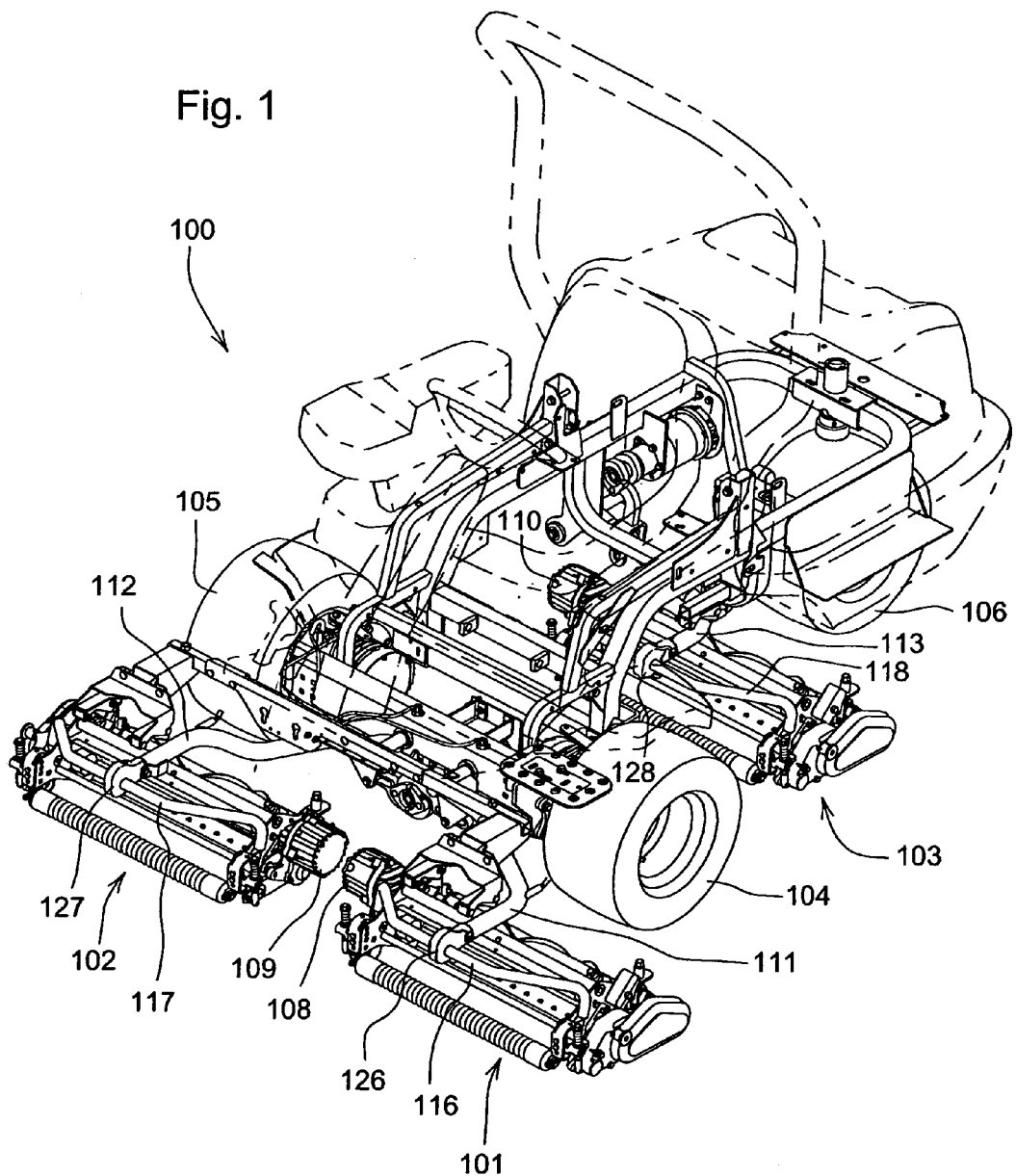
FIG. 1 is a perspective view of a grass mowing machine with an electric implement lift system for mower cutting units according to one embodiment of the invention.

As shown in FIG. 1, grass mowing machine 100 may be a triplex greens mower or trim mower. The grass mowing machine may have three cutting units 101-03, with two of the cutting units 101, 102 mounted in a first or front row, and the third cutting unit 103 mounted behind the first two cutting units so that it may cut the grass left between the first two cutting units. The grass mowing machine may have a pair of front wheels 104, 105 that provide traction drive, and a rear wheel 106 that may be powered and/or steered. An engine or motor to provide traction drive for the wheels may be an electric motor, internal combustion engine, fuel cell, or a combination of power sources. Alternatively, the electric implement lift system according to the present invention may be provided on a grass mowing machine such as a fairway mower having more than three cutting units, or on a smaller grass mowing machine with fewer than three cutting units.

In one embodiment, cutting units 101-03 may be reel-type cutting units that cut grass between a reel and bedknife. Each reel-type cutting unit may have a cutting width of at least about 18 inches and weigh at least about 100 pounds. The reel-type cutting units may be powered by electric motors 108-110 mounted to the side of the cutting unit and operably coupled to a shaft of the cutting reel to rotate the reel adjacent the bedknife. Alternatively, the electric implement lift system may be used with a mowing machine having rotary cutting units with one or more rotating blades mounted to vertical shafts.

In one embodiment, the electric implement lift system for mower cutting units may be used with lift arms 111-13 that extend laterally outwardly from the grass mowing machine to each cutting unit. The inner end of each lift arm may be pivotably mounted to the frame of the grass mowing machine. Each cutting unit may be mounted at the outer end of a lift arm. The mounting connections for the cutting units may include joints 126-28 allowing the cutting units to pivot with respect to the lift arms. For example, the joints may allow the cutting units to pivot on one or more horizontal axes, as well as a vertical axis. Joints 126-28 may be attached to yokes 116-18 which extend across the cutting units and may be attached to the opposing sides of the cutting unit frame structures.

In one embodiment, the electric implement lift system may be provided for a single cutting unit or a pair of cutting units. For example, the triplex mower shown in FIG. 1 includes a first electric implement lift system for cutting units 101, 102, and a second electric implement lift system for cutting unit 103.

Figure 2:
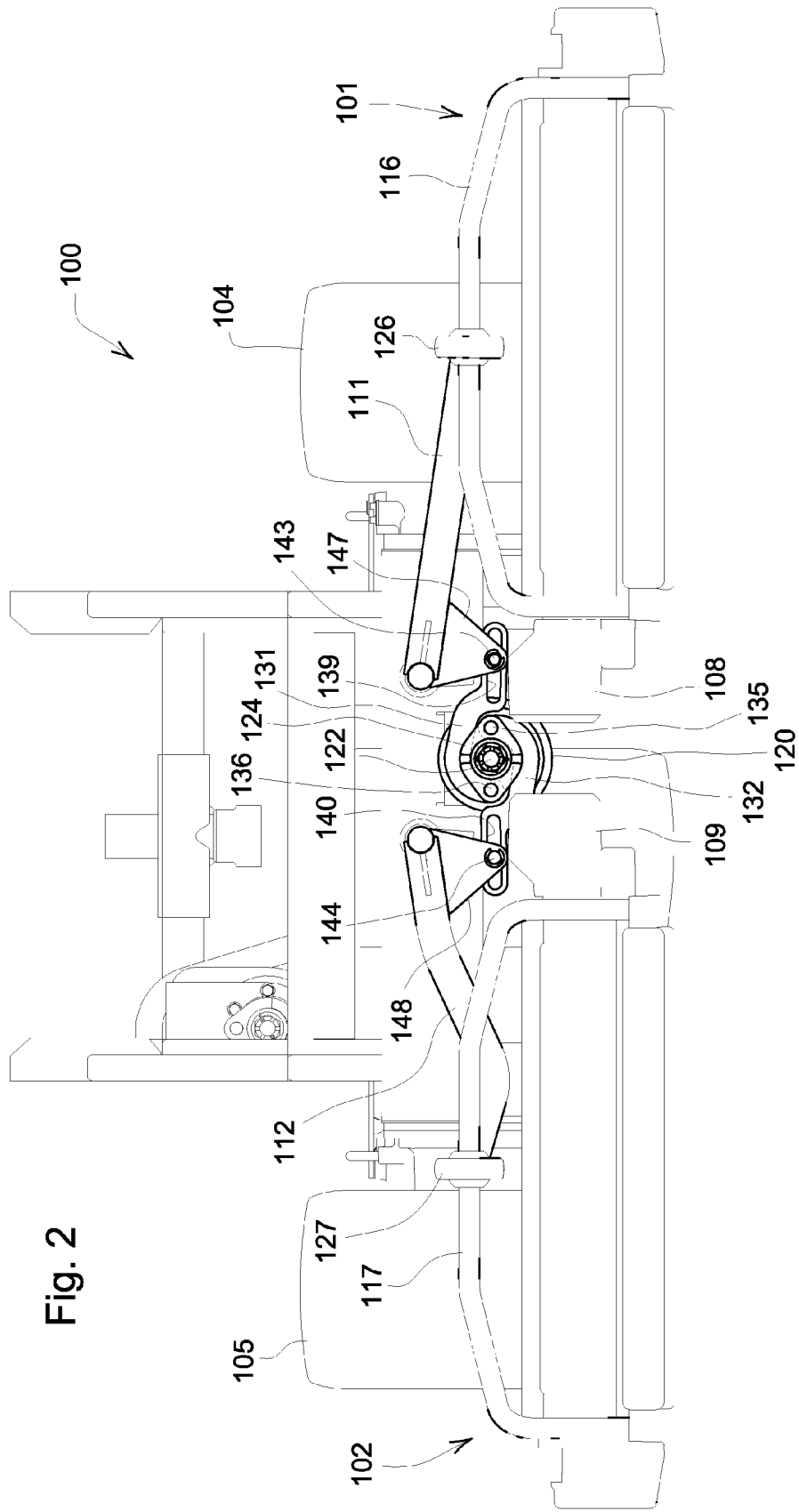
FIG. 2 is a front view of an electric implement lift system for mower cutting units according to one embodiment of the invention, showing left and right front cutting units in a lowered/mowing position.
Figure 3:
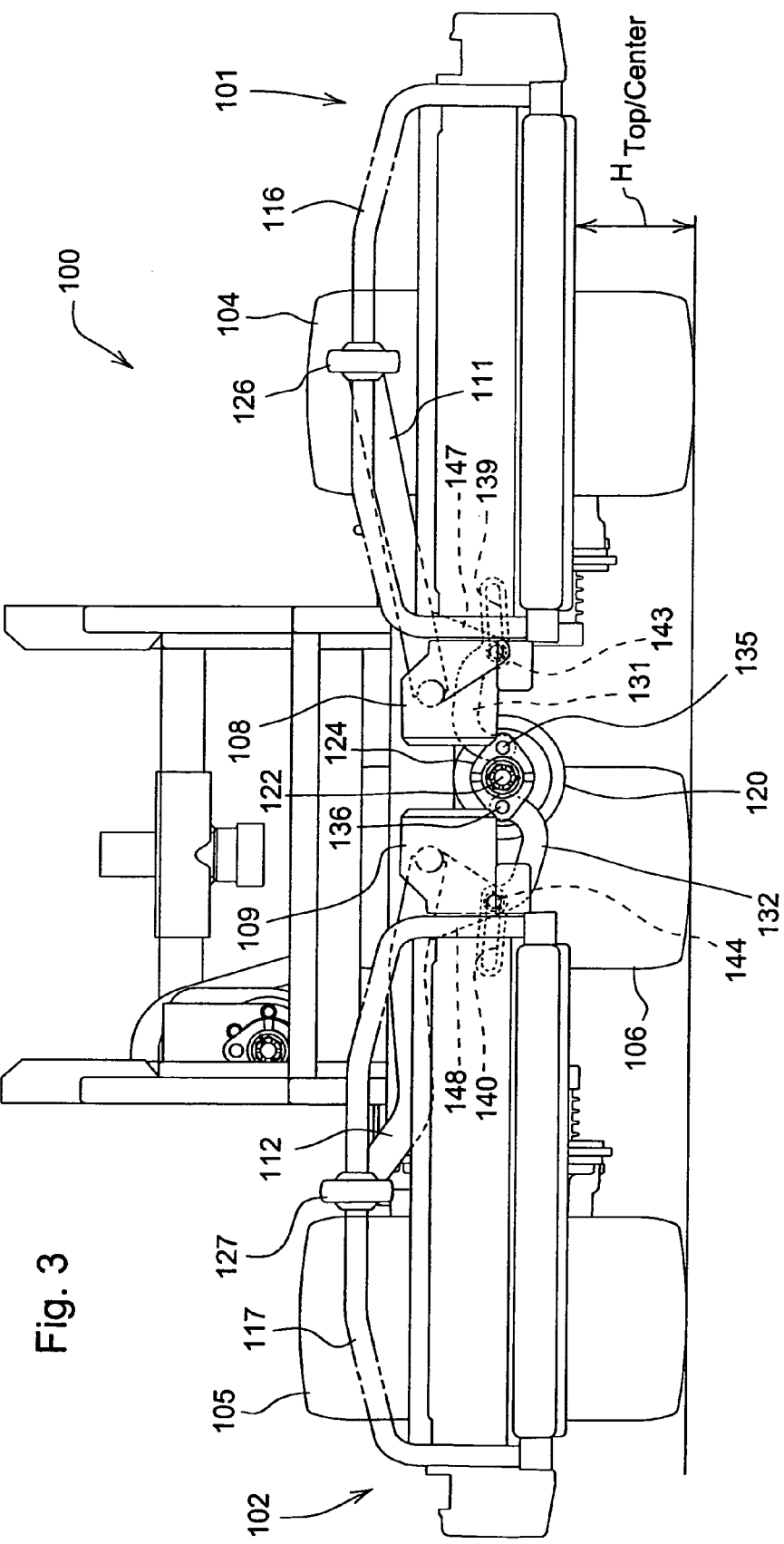
FIG. 3 is a front view of an electric implement lift system for mower cutting units according to one embodiment of the invention, showing left and right front cutting units in a top/center position.
Figure 4:
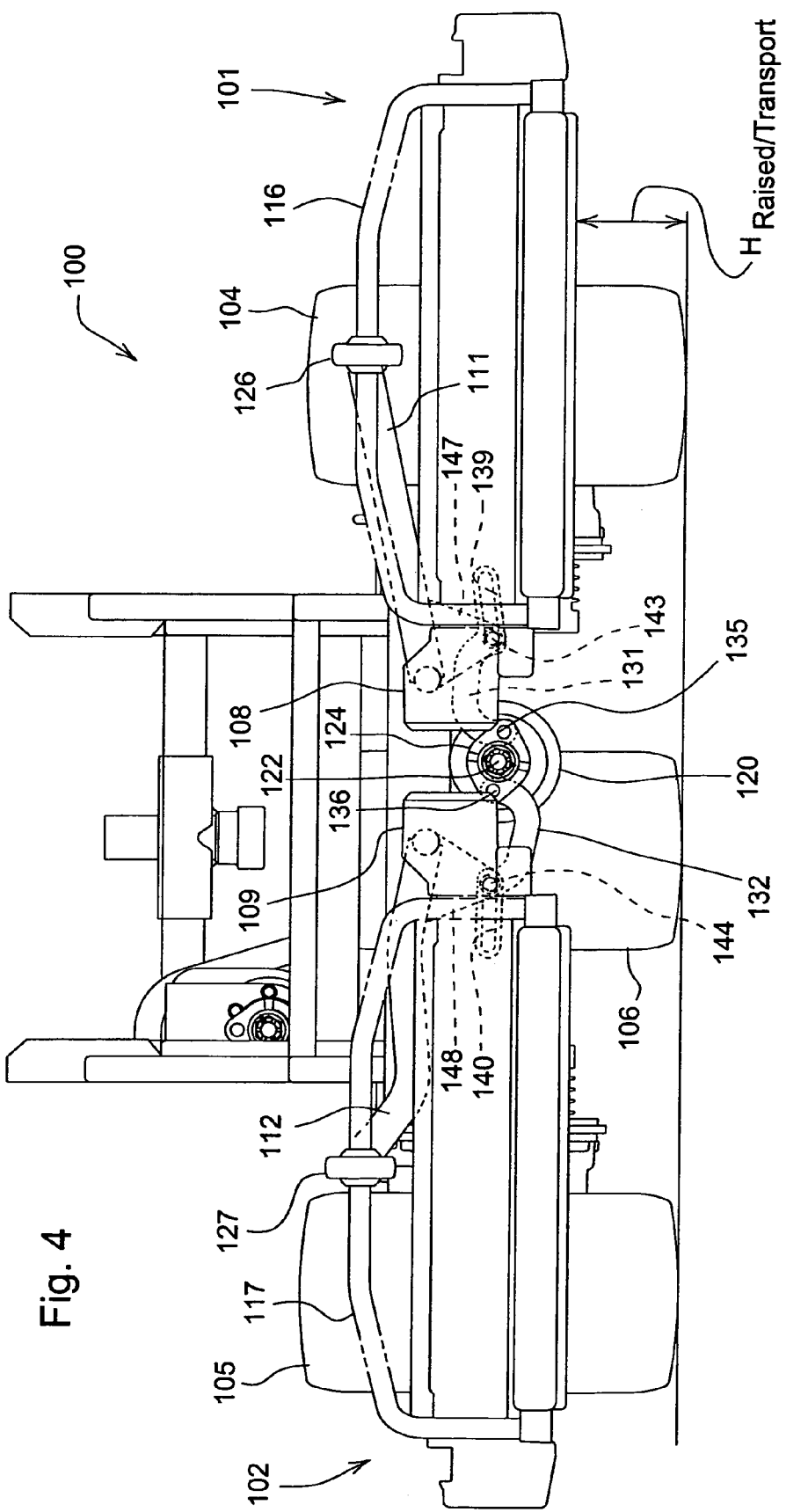
FIG. 4 is a front view of an electric implement lift system for mower cutting units according to one embodiment of the invention, showing left and right front cutting units in a raised/transport position.

FIGS. 2-4 show an embodiment of the electric implement lift system for cutting units 101, 102. FIG. 2 shows cutting units 101, 102 on the ground in a lowered/mowing position. FIG. 3 shows cutting units 101, 102 at a maximum height above the ground which may be a top/center position. FIG. 4 shows cutting units 101, 102 at a raised/transport position which may be slightly lower than the top/center position.

In one embodiment, the electric implement lift system for mower cutting units may include an electric motor 120 that may be a three phase permanent magnet brushless DC motor with an internal relative position sensor. The motor commutation, speed, and torque may be controlled with an external electronic controller. The external electronic controller may contain a microprocessor and may have internal current sensing. The controller may use current as well as the motor position for control feedback. The torque may be limited by the controller to keep the stresses in the mechanical components below an acceptable level. A current or position sensor should stop the electric motor to prevent a full load running into a hard stop when the cutting units reach the raised/transport position. A current limit may be provided to prevent damage to the electric motor if any components bind up or the implement lift system is impeded during operation. The electric motor may be connected to a gearbox to reduce the motor speed and multiply the torque output of the motor. A planetary system or worm drive gearbox may be used. For example, a preferred gear reduction ration may be 95:1.

In one embodiment, the motor and gearbox may turn output shaft 122 with pivot bracket 124 attached thereto. Each of lift links 131, 132 may be pivotably connected to an end of the pivot bracket. Turning the output shaft and pivot bracket in a first direction (on the output shaft axis) will retract both lift links and lower the cutting units, and turning it in a second direction will extend both lift links and raise the cutting units. The output shaft may turn about 180 degrees to move the cutting units between a lowered/mowing position and a top/center position. Additionally, the output shaft may turn about 10 degrees past the top/center position to move the cutting units to a raised/transport position. The cutting units may be slightly lower in the raised/transport position than in the top/center position.

In one embodiment, the inner ends of lift links 131, 132 may be pivotably mounted to the opposing ends of pivot bracket 124 with pins 135,136. The outer ends of lift links 131, 132 may have slots 139, 140. Pivot pins 143, 144 may extend through and slide in the slots as the cutting units are raised or lowered. Pivot pins 143, 144 may be located on lift arms 111, 112 adjacent the inner ends of the lift arms, or on plates 147, 148. Part of each lift link may be configured to wrap around the output shaft when the cutting units are in the lowered/mowing position. In the top/center position, a straight line may extend between output shaft 122, pin 135 and pivot pin 143 for the left front cutting unit, and between output shaft 122, pin 136 and pivot pin 144 for the right cutting unit. In the raised/transport position, each of pins 135 and 136 may be about ten degrees off the lines between output shaft 122 and pivot pins 143, 144.

In one embodiment, the distance between output shaft 122 and the outer end of each lift link 131, 132 may be minimized to move cutting units 101, 102 to a lowered/mowing position shown in FIG. 2. In a lowered/mowing position, pins 143, 144 may be at or near the center of slots 139, 140. The distance between output shaft 122 and the outer end of each lift link 131, 132 may be maximized to move cutting units 101, 102 to a top/center position shown in FIG. 3. In a top/center position, the lift arms and cutting units are at their highest position, and pins 143, 144 may be at or near the inner ends of slots 139, 140. The distance between output shaft 122 and the outer end of each lift link 131, 132 may be decreased slightly from their maximum to move cutting units 101, 102 to a raised/transport position shown in FIG. 4. To reach the raised/transport position, output shaft 122 may be turned about 10 degrees more after reaching the top/center position of FIG. 3.

In one embodiment, a stop may be provided on or adjacent pivot bracket 124 to prevent the pivot bracket and output shaft from turning past the raised/transport position. For example, a stop may be a raised area or abutment on the face of pivot bracket that may engage one or both lift links when reaching the raised/transport position shown in FIG. 4. The stop may prevent rotation of the output shaft and pivot bracket more than about ten degrees past the top/center position.

In one embodiment, the weight of the cutting units may help maintain the cutting units in the raised/transport position without application of torque by the motor. Specifically, the weight of the cutting units may continue to urge rotation of the output shaft and pivot bracket toward the raised/transport position, rather than rotating in the opposite direction toward the top/center position. As a result, the weight of the cutting units holds and maintains the pivot bracket against the stop. To return the cutting units to the lowered/mowing position, sufficient rotational torque must be applied to the output shaft to raise the cutting units from the raised/transport position to the top/center position. As a result, the electric implement lift system for mower cutting units requires no torque to hold and maintain the cutting units in the raised/transport position.

Figure 5:
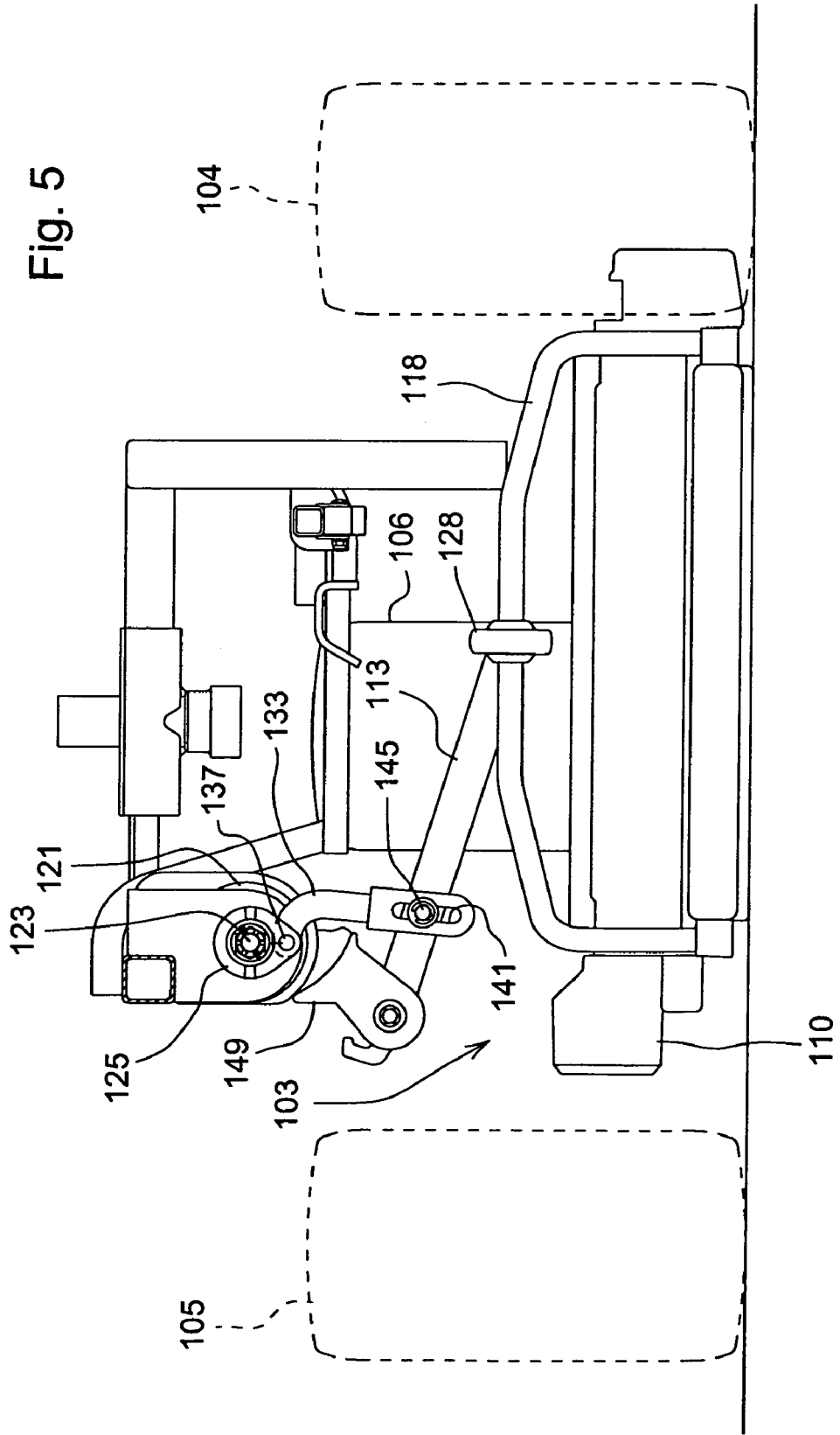
FIG. 5 is a front partial section view of an electric implement lift system for mower cutting units according to one embodiment of the invention, showing a rear cutting unit in a lowered/mowing position.
Figure 6:
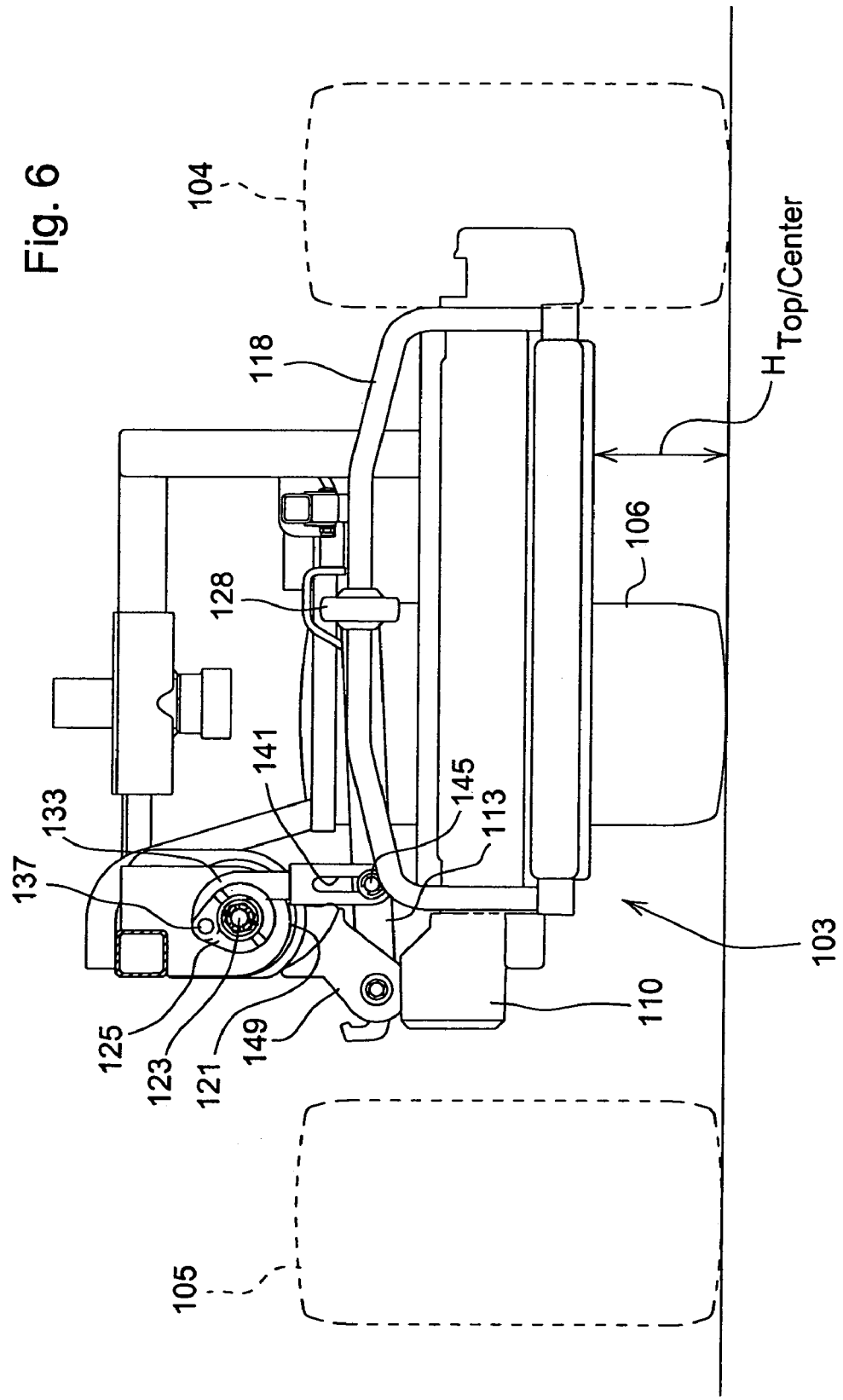
FIG. 6 is a front partial section view of an electric implement lift system for mower cutting units according to one embodiment of the invention, showing a rear cutting unit in a top/center position.

FIGS. 5-7 show an embodiment of the electric implement lift system for raising and lowering cutting unit 103. FIG. 5 shows cutting unit 103 on the ground in a lowered/mowing position. FIG. 6 shows cutting unit 103 at a maximum height above the ground which may be a top/center position. FIG. 7 shows cutting unit 103 at a raised/transport position which may be slightly lower than the top/center position.

In one embodiment, the electric implement lift system may include an electric motor 121, which may be connected to a gearbox to reduce the motor speed and multiply the torque output of the motor. The motor and gearbox may turn output shaft 123 with pivot bracket 125 attached thereto. Lift link 133 may be pivotably connected to an end of the pivot bracket. Turning the output shaft and pivot bracket in a first direction (on the output shaft axis) will retract the lift link and lower the cutting unit, and turning it in a second direction will extend the lift link and raise the cutting unit. The output shaft may turn about 180 degrees to move the cutting unit between a lowered/mowing position and a top/center position. Additionally, the output shaft may turn about 10 degrees beyond the top/center position to move the cutting unit to a raised/transport position. The cutting unit may be slightly lower in the raised/transport position than in the top/center position.

In one embodiment, the inner end of lift link 133 may be pivotably mounted to an end of pivot bracket 125 with pin 137. The outer end of lift link 133 may have slot 141. Pivot pin 145 may extend through and slide in the slot as the cutting unit is raised or lowered. Pivot pin 145 may be attached to lift arm 113 adjacent the inner end of the lift arm, or on plate 149 attached to the lift arm.

In one embodiment, the distance between output shaft 123 and the outer end of lift link 133 may be minimized to move cutting unit 103 to a lowered/mowing position shown in FIG. 5. In a lowered/mowing position, pin 145 may be at or near the center of slot 141. The distance between output shaft 123 and the outer end of lift link 133 may be maximized to move cutting unit 103 to a top/center position shown in FIG. 6. In a top/center position, the lift arm and cutting unit are at their highest position, and pin 145 may be at or near the inner end of slot 141. The distance between output shaft 123 and the outer end of lift link 133 may be decreased slightly from its maximum to move cutting unit 103 to a raised/transport position shown in FIG. 7. To reach the raised/transport position, output shaft 123 may be turned about 10 degrees more after reaching the top/center position of FIG. 6.

In one embodiment, a stop may be provided on or adjacent pivot bracket 125 to prevent the pivot bracket and output shaft from turning past the raised/transport position. For example, a stop may be a raised area or abutment on the face of pivot bracket that may engage one or both lift links when reaching the raised/transport position shown in FIG. 7. The stop may prevent rotation of the output shaft and pivot bracket more than about ten degrees past the top/center position.

Having described the preferred embodiment, it will become apparent that various modifications can be made without departing from the scope of the invention as defined in the accompanying claims.

The invention claimed is:

1. An apparatus comprising:
 a mower cutting unit on a lift arm extending from a mowing vehicle;
 an electric motor having a rotatable output shaft with a pivot bracket mounted to the output shaft;
 a lift link having a first end connected to the pivot bracket and a second end connected to the lift arm;
 the output shaft rotatable in a first direction to raise the mower cutting unit and in a second direction to lower the mower cutting unit;
 wherein the output shaft is rotatable in the first direction to move the cutting unit to a top/center position and rotatable further in the first direction to move the cutting unit to a raised/transport position.

2. The apparatus of claim 1 further comprising a stop limiting the rotation of the output shaft in the first direction.

3. The apparatus of claim 1 wherein the mower cutting unit is a cutting reel.

4. The apparatus of claim 1 wherein the raised/transport position is lower than the top/center position.

5. An electric implement lift system for a mower cutting unit on a lift arm extending from a mowing vehicle, comprising:
 an electric motor turning an output shaft having an axis of rotation;
 a lift link having a first end pivotably attached to the shaft and extending laterally from the shaft in a direction perpendicular to the axis of rotation of the shaft, and a second end pivotably attached to the lift arm;
 the electric motor selectively turning the output shaft to move the lift link relative to the axis of rotation of the shaft between a first position in which the mower cutting unit is on the ground, and a second position in which the mower cutting unit is off the ground.

6. The electric implement lift system of claim 5 further comprising a pair of cutting units on lift arms, and a pair of lift links.

7. The electric implement lift system of claim 5 further comprising a gear reducer between the electric motor and the output shaft.

8. The electric implement lift system of claim 5 further comprising a slot in the second end of the lift arm, and a pin inserted through the slot and engaging the lift arm.

9. The electric implement lift system of claim 5 wherein the mower cutting unit has a weight tending to hold the unit in the second position.

10. An electric implement lift system for a mower cutting unit on a lift arm extending from a mowing vehicle, comprising:
 an electric motor turning an output shaft;
 a lift link having a first end pivotably attached to the shaft and extending laterally from the shaft in a direction perpendicular to the shaft, and a second end pivotably attached to the lift arm;
 the electric motor selectively turning the output shaft between a first position in which the mower cutting unit is on the ground, and a second position in which the mower cutting unit is off the ground;
 wherein the electric motor may raise the cutting unit to a top center position above the second position.

11. An electric implement lift system for mower cutting units, comprising:
 a lift arm having an outer end pivotably attached to the mower cutting unit, and an inner end pivotably attached to a mowing vehicle;
 an electrically powered rotatable shaft mounted to the mowing vehicle; the shaft having an axis of rotation; and
 a lift link extending laterally from the shaft to the lift arm adjacent the inner end of the lift arm; the shaft rotating in a first direction to move the lift link radially outwardly perpendicular to the shaft's axis of rotation to raise the mower cutting unit to a top/center position.

12. The implement lift system of claim 11 further comprising an electric motor and a gear reducer connected to the shaft.

13. The implement lift system of claim 11 further comprising a pair of lift arms having their outer ends pivotably attached to mower cutting units, and a pair of lift links to raise the pair of cutting units.

14. An electric implement lift system for mower cutting units, comprising:
 a lift arm having an outer end pivotably attached to the mower cutting unit, and an inner end pivotably attached to a mowing vehicle;
 an electrically powered rotatable shaft mounted to the mowing vehicle; and a lift link extending laterally from the shaft to the lift arm adjacent the inner end of the lift arm; the shaft rotating in a first direction to move the lift link radially outwardly to raise the mower cutting unit; wherein the shaft is rotatable past a top center position to move the cutting unit to the raised position.

* * * * *